Patented Jan. 25, 1938

2,106,372

UNITED STATES PATENT OFFICE 2,106,372

PROCESS OF PRODUCING POWDERED COCOA SUBSTITUTION

Seiichi Exaki, Nishiyodogawa-Ku, Osaka, Japan

No Drawing. Application August 22, 1936, Serial No. 97,468. In Japan August 12, 1935

4 Claims. (Cl. 99—26)

This invention relates to a process of producing powdered cocoa substitute; it has for its object an improved substitute for powdered cocoa which is produced from the low priced and highly nourishing nuts, provided with means whereby the flavour and taste is similar to natural one and the estimated containing percentage of tein and theobromine is low when the substitute and the natural cocoa are mixed.

The complete process of producing the powdered cocoa substitute comprises,

1. Removing the nut-shell and the interior cuticle of the nut adopted as the raw material in producing the said substitute, 2. Crushing the raw nuts and subjecting them to steamed heat whereby the fatty substance of the fatty nut can be absorbed, 3. Covering the same with lactic acid bacteria, and placing in a suitable room for complete fermentation, 4. After fermented, drying and grilling is performed.

The prime motive of this invention is based on the following:

The flavor and taste of the beverage containing cocoa or the chocolate product is so popular in general that the consuming quantity is shown with a high up-curve. The defect, however, is that children have frequently nose-bleed, dyspepsia, etc., caused by the overexcitation from tein and theobromine of those overeating. The children's liking for the chocolate is not attributable to the desire for excitation. It is, therefore, an urgent need to manufacture the chocolate reducing the tein and theobromine containing percentage as far as possible, and yet retaining the same flavour and taste as the natural cocoa or chocolate.

The reason why this invention adopts the nut stated above as the raw material in producing the substitute of powdered cocoa or bitter-chocolate is that it is best suited in various ways.

The full particulars relating to the newly invented process are as follows:

1. After removal of the nut-shell of the nut, the inner skin, when left, is also removed by means of grilling, or with weak alkali or sulphuric acid liquid; thus the quality of the powdered substitute is uniform.

2. The watering, crushing, and slight steaming process is, first, to keep the lactic acid bacteria in the best state of propogation, secondly to discharge the unneedful fatty substances of the nut; five to ten minutes' steam heating gives the right effect, but caution here is taken in order to prevent farinaceous particles of the nut from becoming starchy by over-steam heating or from destruction of the flavour and taste.

3. The fat absorption process is performed in order to get rid of the excess fat which obstructs the propagation of the lactic acid bacteria and yields an unhealthy smell by fat and oil oxidation in propagation; in some cases which may necessitate another fat absorption after the grilling process, the 40% to 50% absorption brings better effect, but, in this case, sometimes, a little sugar and moisture is needed to apply; in other cases in no need of the absorption after grilling, the material is covered with the lactic acid bacteria in this condition or after applying sugar and moisture, and mixing is performed in ten to fifteen hours' propagation in the propagation room.

4. A fifteen hours' propagation process at 30 degrees C. causes the material to partly decompose, changes it to the state of easy eupepsy, takes the unhealthy smell out, and adds good flavour and taste. The lactic acid bacteria is best for the performance stated above. After this process, proper drying prevents any ill-effect of the material in the grilling process. The material contains now 2% to 3% moisture.

5. The grilling process carried out at approximately 100 degrees C. allows the lactic acid to evaporate, and acidity and an essential smell of the material disappear, and a characteristic fragrance is produced; and the external appearance of the processed material is by no means inferior to powdered cocoa or bitter-chocolate product. When the drying and grilling process is performed under lower pressure, the acidity and the essential smell can be extracted thoroughly.

6. For a highly fat contained raw material of which fat absorption is insufficient at the first process, the absorption process is repeated, then subjected to rolls to press, or crushed by using a ballmill.

What I claim is:

1. Steps in the process of producing powdered cocoa substitute comprising, removing the shell and interior cuticle of at least one of the group consisting of peanut, red Indian bean, loctus nut, acorn of the pasanica, torreya nucifera nut, walnut, as the starting material, then crushing and steam heating of the material whereby the fatty substance of the nut is extracted, then covering with lactic acid bacteria, placing in a fermentation room for a time in order to allow fermentation by the lactic acid bacteria, and then drying and grilling.

2. The process of claim 1 including adding a little sugar to the material before the performance of the lactic acid bacteria fermentation.

3. The process of claim 1 in which the fatty material is partly absorbed of its fat in the fat absorbing process, and the remaining part of the fatty material is absorbed in the same way after grilling is performed, and lastly crushed.

4. The process of claim 1 in which the drying and grilling is performed under lowered pressure.

SEIICHI EZAKI.

CERTIFICATE OF CORRECTION.

Patent No. 2,106,372. January 25, 1938.

SEIICHI EZAKI.

It is hereby certified that error appears in the above numbered patent requiring correction as follows: In the grant, name of patentee, for "Seiichi Ezaki" read Seiichi Ezaki; and that the said Letters Patent should be read with this correction therein that the same may conform to the record of the case in the Patent Office.

Signed and sealed this 14th day of June, A. D. 1938.

(Seal)

Henry Van Arsdale,
Acting Commissioner of Patents.

2. The process of claim 1 including adding a little sugar to the material before the performance of the lactic acid bacteria fermentation.

3. The process of claim 1 in which the fatty material is partly absorbed of its fat in the fat absorbing process, and the remaining part of the fatty material is absorbed in the same way after grilling is performed, and lastly crushed.

4. The process of claim 1 in which the drying and grilling is performed under lowered pressure.

SEIICHI EZAKI.

CERTIFICATE OF CORRECTION.

Patent No. 2,106,372. January 25, 1938.

SEIICHI EZAKI.

It is hereby certified that error appears in the above numbered patent requiring correction as follows: In the grant, name of patentee, for "Selichi Ezaki" read Seiichi Ezaki; and that the said Letters Patent should be read with this correction therein that the same may conform to the record of the case in the Patent Office.

Signed and sealed this 14th day of June, A. D. 1938.

(Seal)

Henry Van Arsdale,
Acting Commissioner of Patents.

CERTIFICATE OF CORRECTION.

Patent No. 2,106,372. January 25, 1938.

SEIICHI EZAKI.

It is hereby certified that error appears in the above numbered pate[nt] requiring correction as follows: In the grant, name of patentee, for "Seli[chi] Ezaki" read Seiichi Ezaki; and that the said Letters Patent should be re[ad] with this correction therein that the same may conform to the record [of] the case in the Patent Office.

Signed and sealed this 14th day of June, A. D. 1938.

(Seal)

Henry Van Arsdale,
Acting Commissioner of Patent[s]